United States Patent
Kondo et al.

(10) Patent No.: US 7,609,324 B2
(45) Date of Patent: Oct. 27, 2009

(54) SIGNAL PROCESSING APPARATUS AND METHOD FOR GENERATING A CORRECTED IMAGE HAVING A LARGE NUMBER OF PIXELS FROM AN IMAGE HAVING A LESSER NUMBER OF PIXELS, AND RECORDING MEDIUM HAVING A PROGRAM RECORDED THEREON FOR PERFORMING SUCH METHOD

(75) Inventors: Tetsujiro Kondo, Tokyo (JP); Shizuo Chikaoka, Tokyo (JP); Takeshi Miyai, Tokyo (JP); Yoshiaki Nakamura, Tokyo (JP); Takashi Nakanishi, Tokyo (JP); Tsugihiko Haga, Kanagawa (JP); Daisuke Kikuchi, Tokyo (JP)

(73) Assignee: Sony Corporation (JP)

( * ) Notice: Subject to any disclaimer, the term of this patent is extended or adjusted under 35 U.S.C. 154(b) by 860 days.

(21) Appl. No.: 11/110,129

(22) Filed: Apr. 20, 2005

(65) Prior Publication Data
US 2005/0238247 A1 Oct. 27, 2005

(30) Foreign Application Priority Data
Apr. 20, 2004 (JP) ............................ P2004-124270

(51) Int. Cl.
H04N 11/00 (2006.01)
G06K 9/32 (2006.01)

(52) U.S. Cl. ........................ 348/458; 348/448; 382/300

(58) Field of Classification Search ................. 348/458, 348/448, 452, 581, 714, 716, 441, 701; 382/260, 382/261, 270–275, 298–300
See application file for complete search history.

(56) References Cited

U.S. PATENT DOCUMENTS

| 5,619,272 | A | * | 4/1997 | Salmon et al. | ............... 348/452 |
| 5,625,421 | A | * | 4/1997 | Faroudja et al. | ............. 348/607 |
| 5,844,616 | A | * | 12/1998 | Collet et al. | ................ 348/441 |
| 5,973,746 | A | * | 10/1999 | Nakamoto et al. | .......... 348/458 |
| 6,297,847 | B1 | * | 10/2001 | Fisch | .......................... 348/447 |
| 6,389,180 | B1 | * | 5/2002 | Wakisawa et al. | ........... 382/298 |
| 6,545,719 | B1 | * | 4/2003 | Topper | ....................... 348/448 |
| 2003/0020830 | A1 | * | 1/2003 | Sani et al. | .................... 348/447 |
| 2003/0095204 | A1 | * | 5/2003 | Nakamoto et al. | .......... 348/447 |

FOREIGN PATENT DOCUMENTS

JP    2000-078536 A    3/2000

* cited by examiner

*Primary Examiner*—Victor R Kostak
(74) *Attorney, Agent, or Firm*—Lerner, David, Littenberg, Krumholz & Mentlik, LLP

(57) ABSTRACT

A signal processing apparatus includes a generator operable to generate a second image signal by converting a first image signal into the second image signal; a calculation unit operable to calculate a correction amount based on an evaluation of the second image signal relative to the first image signal; and a correction unit operable to correct the second image signal based on the correction amount.

8 Claims, 11 Drawing Sheets

SIGNAL PROCESSING APPARATUS AND METHOD FOR GENERATING A CORRECTED IMAGE HAVING A LARGE NUMBER OF PIXELS FROM AN IMAGE HAVING A LESSER NUMBER OF PIXELS, AND RECORDING MEDIUM HAVING A PROGRAM RECORDED THEREON FOR PERFORMING SUCH METHOD

CROSS-REFERENCE TO RELATED APPLICATIONS

The present application claims priority from Japanese Patent Application No. JP 2004-124270 filed Apr. 20, 2004, the disclosure of which is hereby incorporated by reference herein.

BACKGROUND OF THE INVENTION

The present invention relates to signal processing apparatuses and methods and to recording media and programs for controlling the signal processing apparatuses and methods, and more particularly, to a signal processing apparatus and method capable of generating high-quality images and to a recording medium and a program for controlling such signal processing apparatus and method.

Recently, due to an increase in the size of display screens for television receivers, images often have been displayed using image signals having a large number of pixels. Thus, for example, processing for converting pixels into quadruple-density pixels in order to convert standard-definition (SD) images into high-definition (HD) images is suggested, for example, in Japanese Unexamined Patent Application Publication No. 2000-78536. Thus, viewers can view higher-quality images on large screens.

However, when an output image is generated using a linear prediction coefficient, a unique output image is determined from an input image. In addition, for example, when a method is adopted for performing classification by adaptive dynamic range coding (ADRC), for reading an optimal prediction coefficient from among prediction coefficients learned in advance in accordance with the classification, and for generating an output image in accordance with the prediction coefficient, a unique output image is determined depending on the input image. Although in order to reduce the error between an input image and an output image, a prediction coefficient is generated by learning many supervisor images in advance, the error may not be satisfactorily reduced for some input images.

In such cases, the high-resolution images that are generated have been output as they are. For example, by quadruple-density conversion, four pixels are generated from one pixel using respective independent linear prediction coefficients. Since the characteristics of the processing performed between the four pixels are different from the characteristics of the processing performed between another four pixels acquired from another input pixel, discontinuity may occur.

As a result, users may not be able to view images with high quality.

SUMMARY OF THE INVENTION

It is desirable to provide images with higher quality.

According to an embodiment of the present invention, a signal processing apparatus includes a generator operable to generate a second image signal by converting a first image signal into the second image signal; a calculation unit operable to calculate a correction amount based on an evaluation of the second image signal relative to the first image signal; and a correction unit operable to correct the second image signal based on the correction amount.

A block of pixels from among pixels constituting the second image signal includes a target pixel, and the calculation unit may calculate a coefficient representing the evaluation based on the relationship between a first difference between the target pixel and pixels other than the target pixel within the block of pixels and a second difference between the target pixel and pixels outside the block of pixels.

The calculation unit may include a first difference calculation unit operable to calculate the first difference between the target pixel and the pixels other than the target pixel within the block of pixels; a second difference calculation unit operable to calculate the second difference between the target pixel and the pixels outside the block of pixels; a first average value calculation unit operable to calculate the average of the first differences in a frame; a second average value calculation unit operable to calculate the average of the second differences in the frame; a coefficient calculation unit operable to calculate the coefficient based on a ratio of the average of the first differences in the frame and the average of the second differences in the frame; and a correction amount calculation unit operable to calculate the correction amount based on the coefficient and the second difference.

According to an embodiment of the present invention, a signal processing method includes generating a second image signal by converting a first image signal into the second image signal; calculating a correction amount based on an evaluation of the second image signal relative to the first image signal; and correcting the second image signal based on the correction amount.

According to an embodiment of the present invention, a recording medium is recorded with a computer-readable program for performing a signal processing method, the method including generating a second image signal by converting a first image signal into the second image signal; calculating a correction amount based on an evaluation of the second image signal relative to the first image signal; and correcting the second image signal based on the correction amount.

According to an embodiment of the present invention, a system for performing a signal processing method includes a processor operable to execute instructions; and instructions, the instructions including generating a second image signal by converting a first image signal into the second image signal; calculating a correction amount based on an evaluation of the second image signal relative to the first image signal; and correcting the second image signal based on the correction amount.

Accordingly, a correction amount is calculated in accordance with an evaluation of a second image signal relative to a first image signal, the second image signal being generated by performing pixel conversion on the first image signal, and the second image signal is corrected based on the correction amount.

DETAILED DESCRIPTION

Embodiments of the present invention will be described with reference to the drawings.

Figure 1:
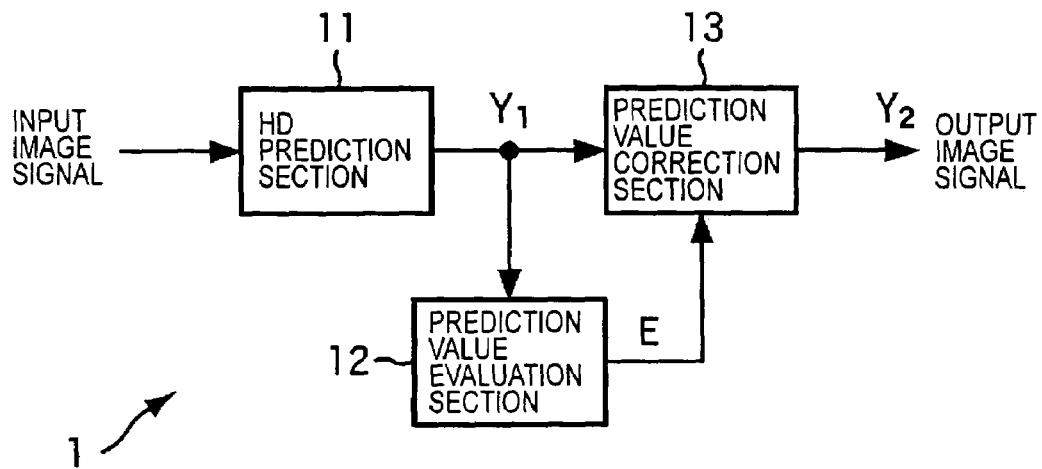
FIG. 1 is a block diagram showing an example of the functional structure of a signal processing apparatus according to an embodiment of the present invention.

FIG. 1 shows an example of the functional structure of a signal processing apparatus 1 according to an embodiment of the present invention. The signal processing apparatus 1 includes an HD prediction section 11, a prediction value evaluation section 12, and a prediction value correction section 13.

An input image signal is input to the HD prediction section 11. For example, when the input image signal is an SD image signal, the HD prediction section 11 converts the SD image signal into an HD image signal and outputs the HD image signal as a signal $Y_1$ to the prediction value evaluation section 12 and the prediction value correction section 13. The prediction value evaluation section 12 evaluates the HD image signal received as a prediction value from the HD prediction section 11, calculates a correction amount E, and supplies the correction amount E to the prediction value correction section 13. The prediction value correction section 13 corrects the HD image signal received from the HD prediction section 11 in accordance with the correction amount E supplied from the prediction value evaluation section 12, and outputs an output image signal as a signal $Y_2$.

Figure 2:
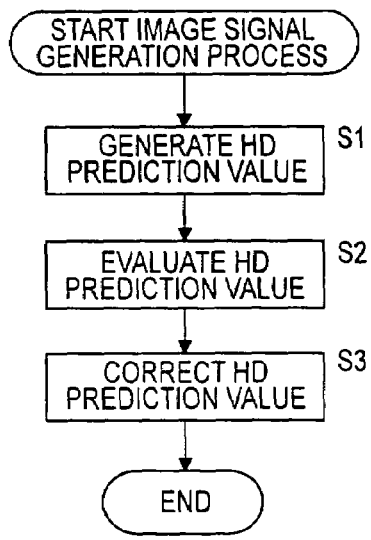
FIG. 2 is a flowchart of an image signal generation process performed by the signal processing apparatus shown in FIG. 1.

A process for generating an image signal performed by the signal processing apparatus 1 shown in FIG. 1 is described next with reference to the flowchart shown in FIG. 2.

In step S1, the HD prediction section 11 generates an HD prediction value from an input image signal. In other words, the HD prediction section 11 generates an HD image signal, as an HD prediction value, from a received SD image signal, and outputs the generated HD image signal to the prediction value evaluation section 12 and the prediction value correction section 13. A process for generating the HD prediction value will be described below with reference to FIGS. 3 and 4.

In step S2, the prediction value evaluation section 12 evaluates the HD prediction value received from the HD prediction section 11. The operation of the prediction value evaluation section 12 will be described below with reference to FIGS. 6 and 12. Accordingly, the prediction value generated by the HD prediction section 11 is evaluated, and a correction amount E is calculated in accordance with the evaluation.

In step S3, the prediction value correction section 13 corrects the HD prediction value. In other words, a signal $Y_2$, as a corrected HD image signal, is calculated by subtracting the correction amount E supplied from the prediction value evaluation section 12 from the prediction value $Y_1$, which is the HD image signal supplied from the HD prediction section 11, in accordance with equation (1).

$$Y_2 = Y_1 - E \qquad (1)$$

Figure 3:
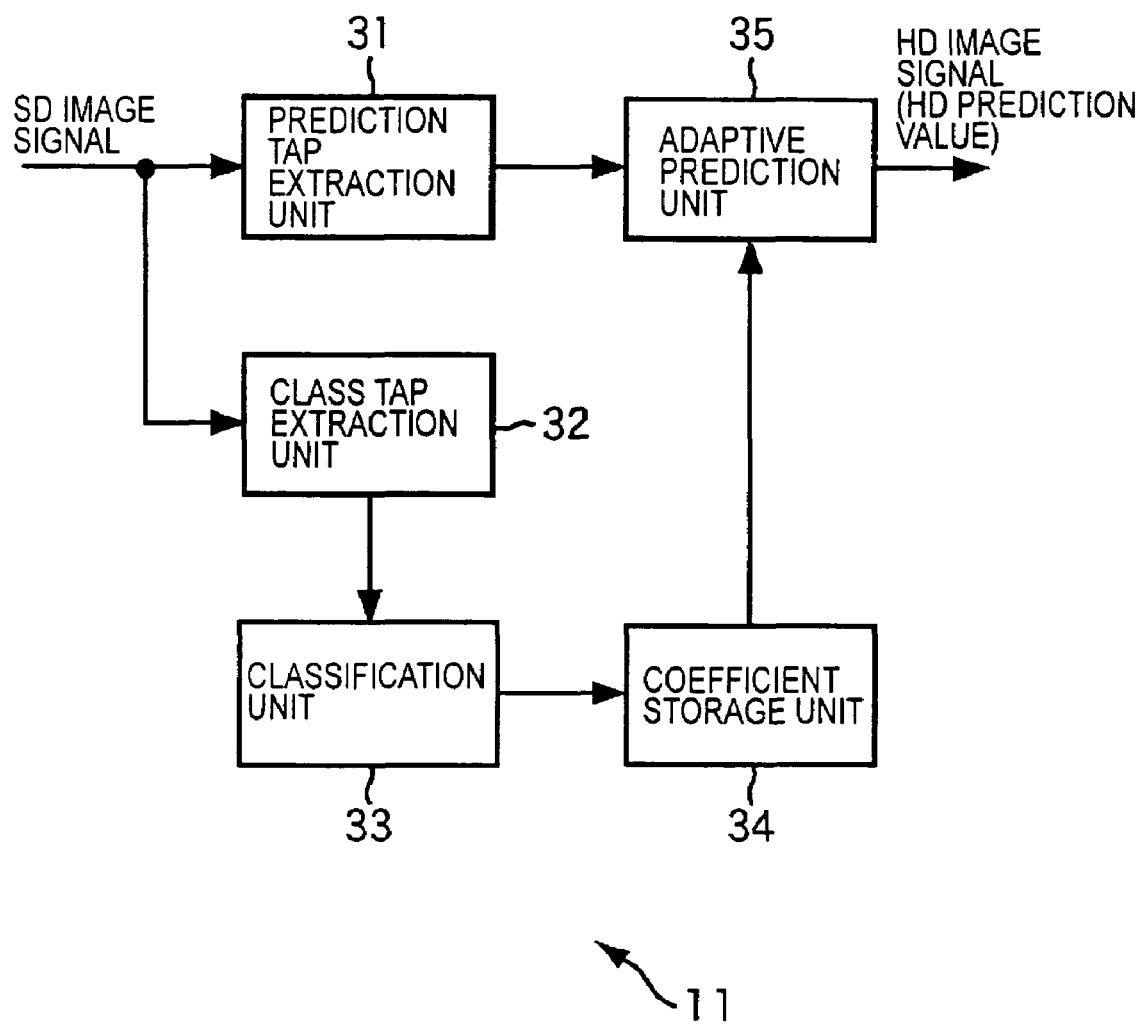
FIG. 3 is a block diagram showing an example of the functional structure of an HD prediction section shown in FIG. 1.

FIG. 3 is a block diagram showing the functional structure of the HD prediction section 11. As shown in FIG. 3, the HD prediction section 11 includes a prediction tap extraction unit 31, a class tap extraction unit 32, a classification unit 33, a coefficient storage unit 34, and an adaptive prediction unit 35.

The prediction tap extraction unit 31 extracts a prediction tap from the SD image signal, which is an input image signal, and supplies the extracted prediction tap to the adaptive prediction unit 35. The class tap extraction unit 32 extracts a class tap from the received SD image signal, and outputs the extracted class tap to the classification unit 33. The position of a pixel in the received SD image signal that is extracted as the prediction tap by the prediction tap extraction unit 31 and the position of a pixel in the received SD image signal that is extracted as the class tap by the class tap extraction unit 32 are determined in advance.

The classification unit 33 determines a class in accordance with the value of a pixel constituting the class tap received from the class tap extraction unit 32, and outputs code corresponding to the class to the coefficient storage unit 34. Prediction coefficients generated for each class by learning many images in advance are stored in the coefficient storage unit 34. The coefficient storage unit 34 reads the prediction coefficient corresponding to the class received from the classification unit 33, and outputs the prediction coefficient to the adaptive prediction unit 35. The adaptive prediction unit 35 applies the value of the pixel constituting the prediction tap extracted by the prediction tap extraction unit 31 and the prediction coefficient supplied from the coefficient storage unit 34 to a first linear combination formula, and generates an HD image signal as an HD prediction value.

Figure 4:
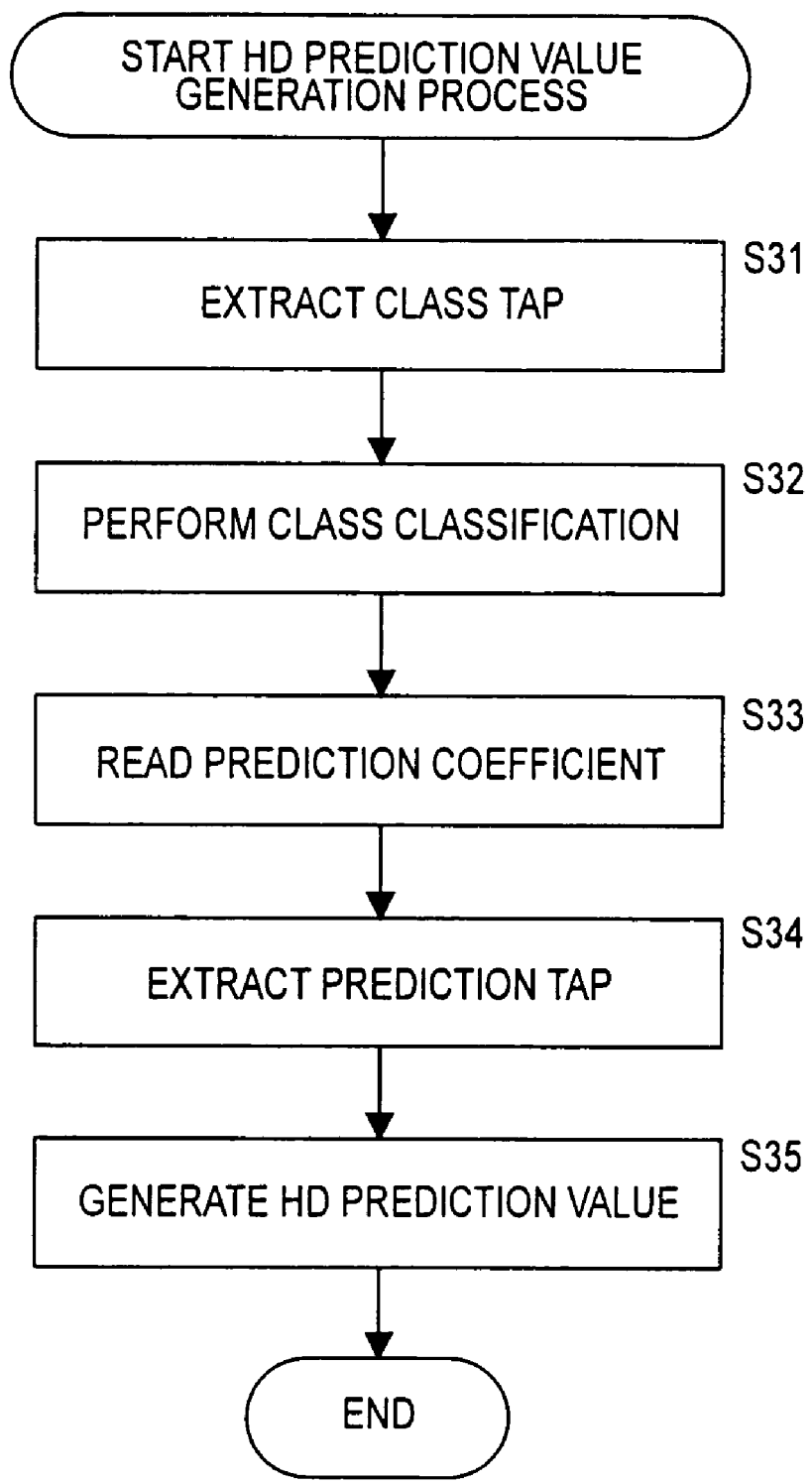
FIG. 4 is a flowchart of an HD prediction value generation process.

A process for generating an HD prediction value performed by the HD prediction section 11 is described next with reference to the flowchart shown in FIG. 4.

In step S31, the class tap extraction unit 32 extracts a class tap from a received SD image signal. The extracted class tap is supplied to the classification unit 33. In step 32, the classification unit 33 performs classification. In other words, a class is determined by performing, for example, 1-bit ADRC processing on the value of the class tap received from the class tap extraction unit 32. The determined class corresponds to the characteristics of the received SD image signal. In step S33, the coefficient storage unit 34 reads a prediction coefficient. More specifically, the prediction coefficient corresponding to the class code received from the classification unit 33 is read, and the read prediction coefficient is supplied to the adaptive prediction unit 35. Since this class code corresponds to the characteristics of the received SD image signal, the prediction coefficient corresponds to the characteristics of the SD image signal.

In step S34, the prediction tap extraction unit 31 extracts a prediction tap. The extracted prediction tap is supplied to the adaptive prediction unit 35. In step S35, the adaptive prediction unit 35 generates an HD prediction value. In other words, the HD prediction value is calculated by applying the pixel value of the prediction tap supplied from the prediction tap extraction unit 31 and the prediction coefficient read by the coefficient storage unit 34 to a predetermined first linear prediction formula.

Figure 5:
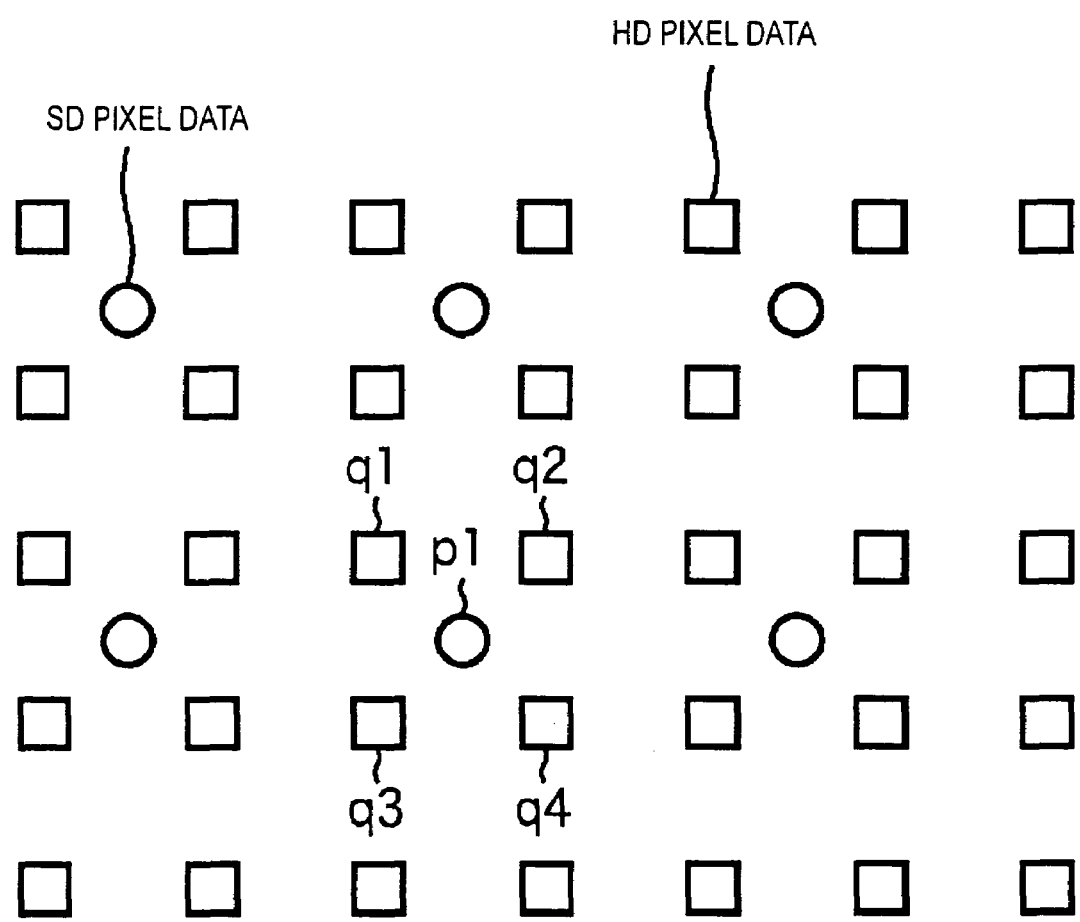
FIG. 5 is an illustration for explaining the relationship between SD pixel data and HD pixel data.

As described above, for example, as shown in FIG. 5, HD pixel data represented by squares having four times the pixel density is generated from SD pixel data represented by circles. In this case, as shown in FIG. 5, for example, one piece of SD pixel data p1 corresponds to four pieces of HD pixel data q1 to q4 around the SD pixel data p1.

As described above, a higher-density HD image signal generated from an SD image signal is supplied to the prediction value evaluation section 12 and the prediction value correction section 13.

Figure 6:
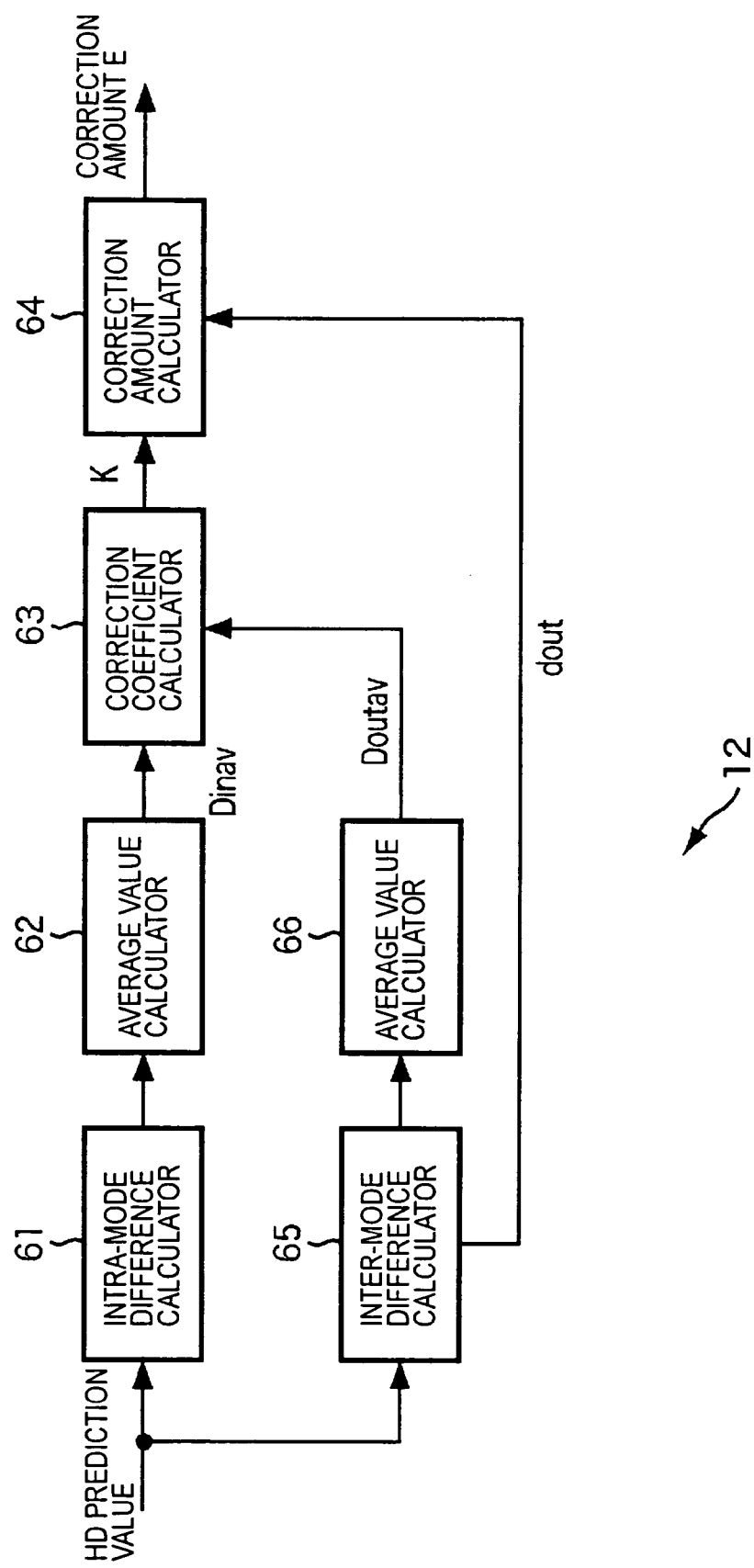
FIG. 6 is a block diagram showing an example of the functional structure of a prediction value evaluation section shown in FIG. 1.

FIG. 6 shows an example of the functional structure of the prediction value evaluation section 12. The prediction value evaluation section 12 includes an intra-mode difference calculator 61, an average value calculator 62, a correction coefficient calculator 63, a correction amount calculator 64, an inter-mode difference calculator 65, and an average value calculator 66.

Figure 7:
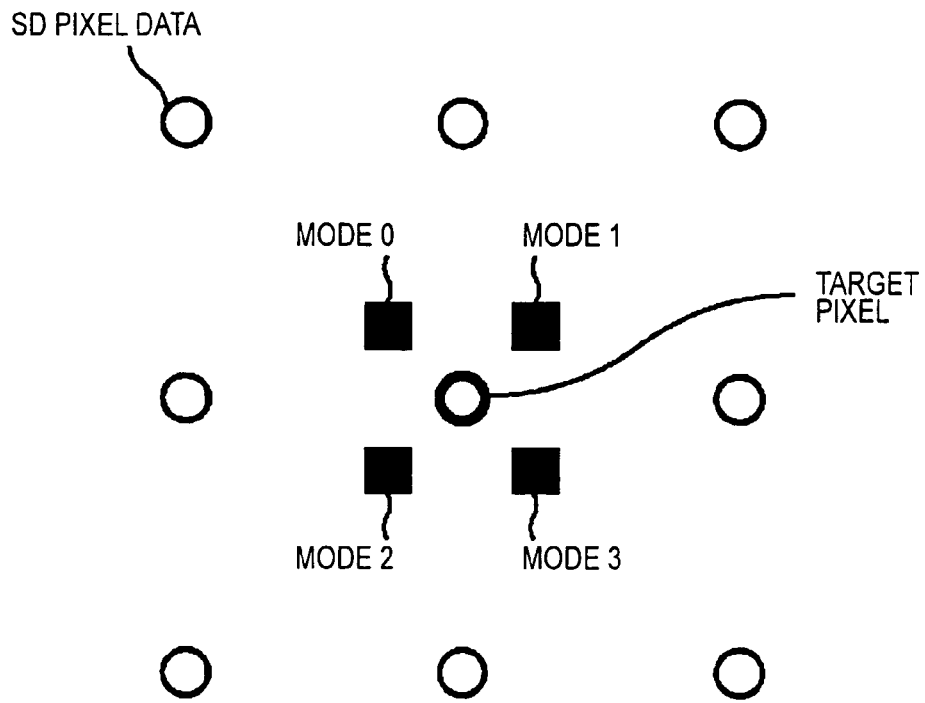
FIG. 7 is an illustration for explaining modes.

The intra-mode difference calculator 61 calculates an intra-mode difference value of HD prediction values supplied from the adaptive prediction unit 35 of the HD prediction section 11. Similarly, the inter-mode difference calculator 65 calculates an inter-mode difference value of the received HD prediction values. In this embodiment, as shown in FIG. 7, with respect to a target pixel in SD pixel data, four surrounding HD pixels are set to modes 0 to 3. In the example shown in FIG. 7, an HD pixel on the upper left of the target pixel is set to the mode 0, an HD pixel on the upper right of the target pixel is set to the mode 1, an HD pixel on the lower left of the target pixel is set to the mode 2, and an HD pixel on the lower right of the target pixel is set to the mode 3.

Figure 8:
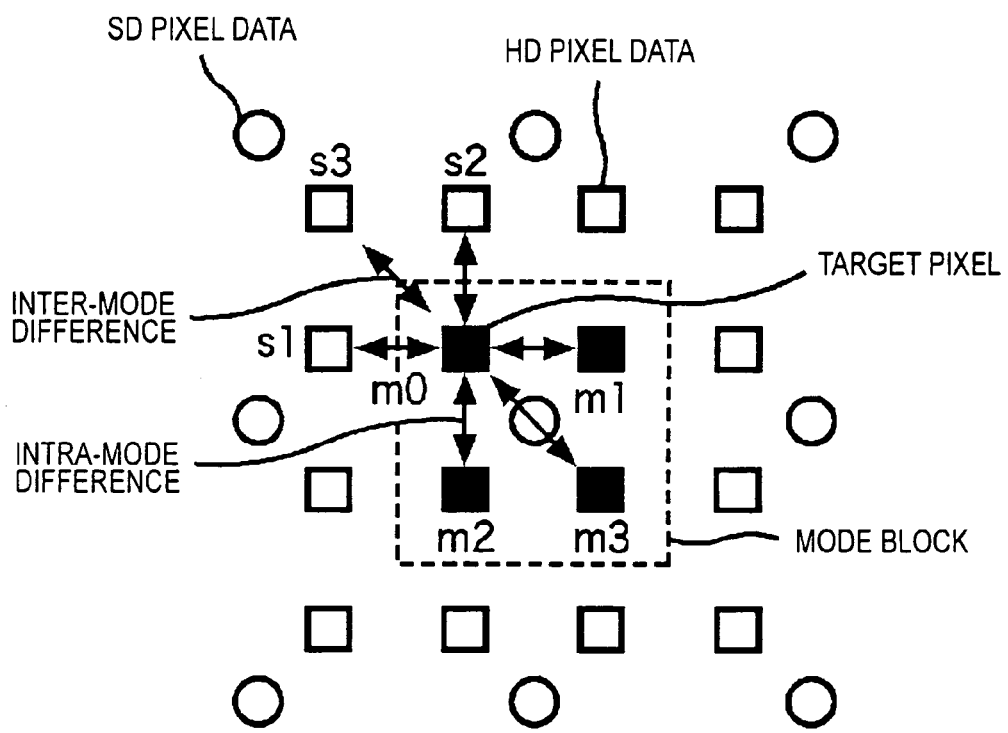
FIG. 8 is an illustration for explaining an intra-mode difference and an inter-mode difference.

As shown in FIG. 8, four pixels m0, m1, m2, and m3 in the modes 0, 1, 2, and 3 constitute a mode block. One of the pixels m0 to m3 is set as a target pixel, and the difference between the target pixel and the other pixels in the mode block is calculated as an intra-mode difference. In the example shown in FIG. 8, the upper-left pixel m0 in the mode 0 is set as the target pixel. Thus, the difference between the target pixel m0 in the mode 0 and the pixel m1 in the mode 1, the pixel m2 in the mode 2, and the pixel m3 in the mode 3 is calculated as an intra-mode difference. In other words, the intra-mode difference $D_{in}$ is represented by equation (2).

$$D_{in}=|m0-m1|+|m0-m2|+|m0-m3| \quad (2)$$

As is clear from equation (2), in this example, the sum of the absolute values of the differences between the target pixel and the pixels in the other three modes is obtained as the intra-mode difference $D_{in}$.

In contrast, the difference between the target pixel and pixels that are not within the mode block for the target pixel is obtained as an inter-mode difference. In other words, in the example shown in FIG. 8, since the target pixel m0 is on the upper left corner of the mode block, the difference between the target pixel m0 and pixels s1, s2, and s3, which are on the left, above, and upper left, respectively, of the target pixel m0, is an inter-mode difference. In other words, the inter-mode difference $D_{out}$ is calculated using equation (3) as the sum of the absolute values of the differences between the target pixel m0 and the pixel s1, which is on the left of the target pixel m0, between the target pixel m0 and the pixel s2, which is above the target pixel m0, and between the target pixel m0 and the pixel s3, which is on the upper left of the target pixel m0.

$$D_{out}=|m0-s1|+|m0-s2|+|m0-s3| \quad (3)$$

Figure 9:
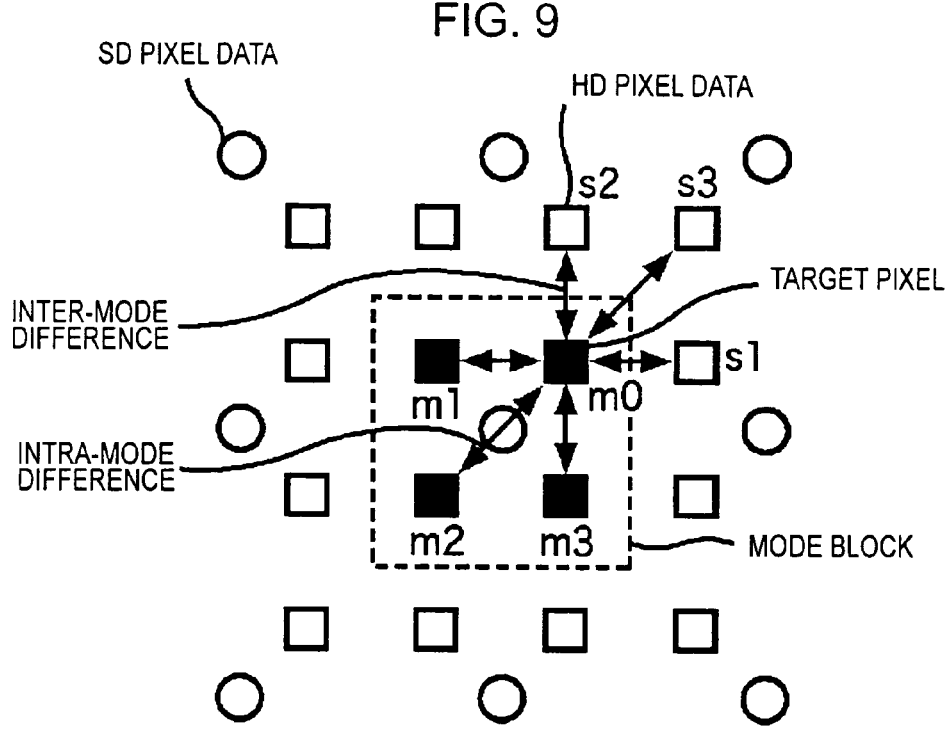
FIG. 9 is an illustration for explaining the intra-mode difference and the inter-mode difference.

For example, if the pixel m0 located on the upper right corner of the mode block is set as the target pixel, as shown in FIG. 9, the sum of the absolute values of the differences between the target pixel m0 and the pixel s1, which is on the right of the target pixel m0, between the target pixel m0 and the pixel s2, which is above the target pixel m0, and between the target pixel m0 and the pixel s3, which is on the upper right of the target pixel m0, is obtained as the inter-mode difference $D_{out}$.

In FIG. 9, the sum of the absolute values of the differences between the target pixel m0 and the other three pixels m1, m2, and m3 in the mode block is obtained as the intra-mode difference $D_{in}$, as in the example shown in FIG. 8.

Figure 10:
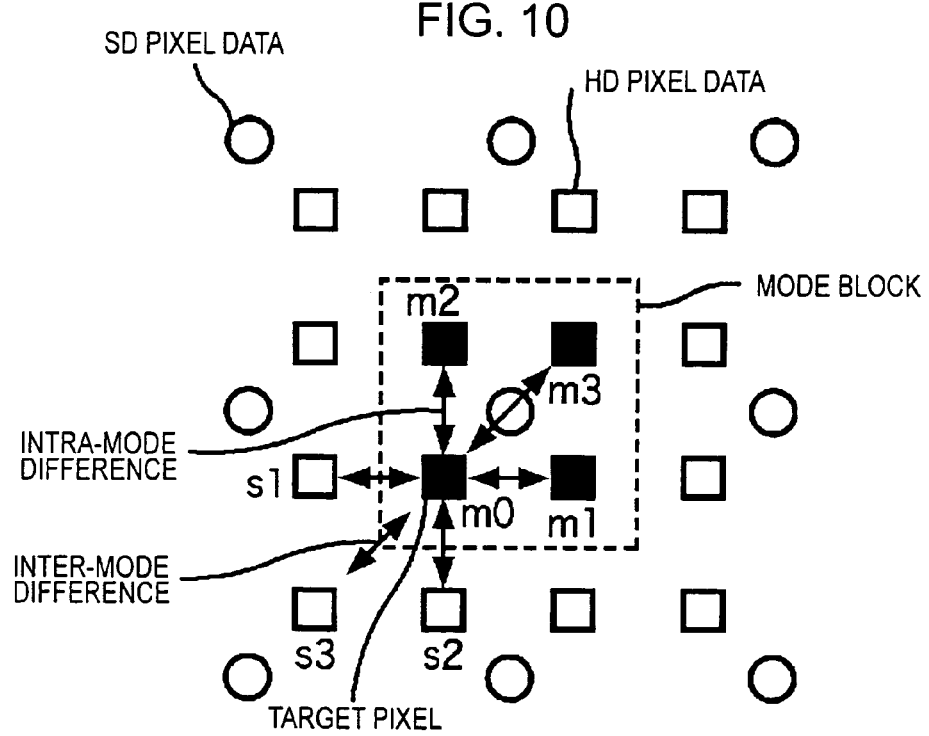
FIG. 10 is an illustration for explaining the intra-mode difference and the inter-mode difference.
Figure 11:
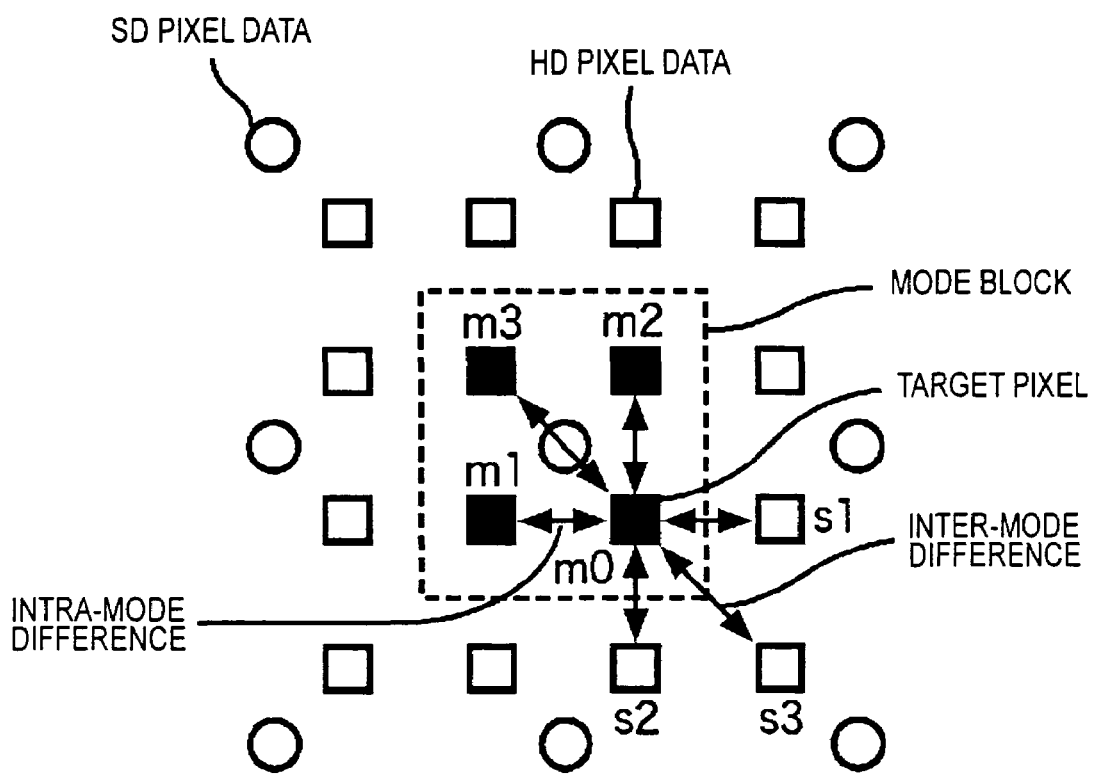
FIG. 11 is an illustration for explaining the intra-mode difference and the inter-mode difference.

For example, if the pixel m0 located on the lower left corner of the mode block is set as the target pixel, as shown in FIG. 10, the sum of the absolute values of the differences between the target pixel m0 and the pixel s1, which is on the left of the target pixel m0, between the target pixel m0 and the pixel s2, which is below the target pixel m0, and between the target pixel m0 and the pixel s3, which is on the lower left of the target pixel m0, is obtained as the inter-mode difference $D_{out}$. The sum of the absolute values of the differences between the target pixel m0 and the other three pixels m1, m2, and m3 in the mode block is obtained as the intra-mode difference $D_{in}$.

For example, if the pixel m0 located on the lower right corner of the mode block is set as the target pixel, the sum of the absolute values of the differences between the target pixel m0 and the pixel s1, which is on the right of the target pixel m0, between the target pixel m0 and the pixel s2, which is below the target pixel m0, and between the target pixel m0 and the pixel s3, which is on the lower right of the target pixel m0, is obtained as the inter-mode difference $D_{out}$. The sum of the absolute values of the differences between the target pixel m0 and the other three pixels m1, m2, and m3 in the mode block is obtained as the intra-mode difference $D_{in}$.

Referring back to FIG. 6, the average value calculator 62 calculates an intra-mode difference average $D_{inav}$, which is the average of the intra-mode differences in a frame calculated by the intra-mode difference calculator 61. The average value calculator 66 calculates an inter-mode difference average $D_{outav}$, which is the average of the inter-mode differences in the frame calculated by the inter-mode difference calculator 65.

The correction coefficient calculator 63 calculates a correction coefficient K using equation (4) in accordance with the intra-mode difference average $D_{inav}$ calculated by the average value calculator 62 and the inter-mode difference average $D_{outav}$ calculated by the average value calculator 66.

$$K = \frac{D_{inav}}{D_{outav}} \quad (4)$$

The correction amount calculator 64 calculates a correction amount E using equation (5) in accordance with the correction coefficient K calculated by the correction coefficient calculator 63 and an inter-mode difference $d_{out}$ calculated by the inter-mode difference calculator 65.

$$E = (1-K) \times \frac{d_{out}}{2} \quad (5)$$

The inter-mode difference $d_{out}$ used in equation (5) is obtained by equation (6).

$$d_{out} = \frac{\{(m0-s1)+(m0-s2)+(m0-s3)\}}{3} \quad (6)$$

Figure 12:
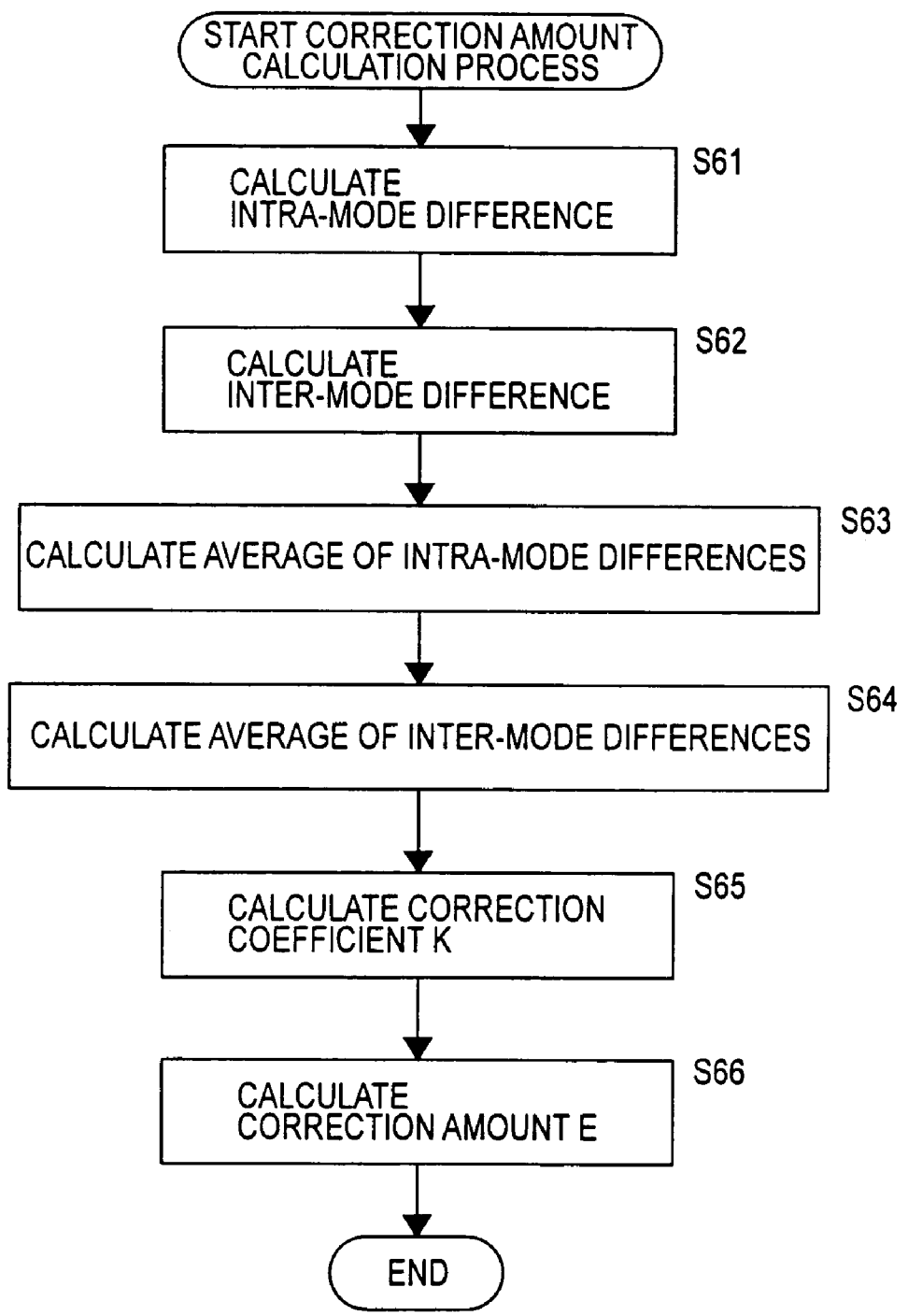
FIG. 12 is a flowchart of a correction amount calculation process.

A process for calculating a correction amount performed by the prediction value evaluation section 12 is described next with reference to the flowchart shown in FIG. 12.

In step S61, the intra-mode difference calculator 61 calculates an intra-mode difference. More specifically, a mode block is arranged in a predetermined position of a frame constituted by HD pixel data, and a pixel from among four pixels constituting the mode block is set as a target pixel. The intra-mode difference $D_{in}$ is calculated in accordance with equation (2). In step S62, the inter-mode difference calculator 65 calculates an inter-mode difference $D_{out}$ in accordance with equation (3).

Calculation of intra-mode differences and calculation of inter-mode differences are performed by the intra-mode difference calculator 61 and the inter-mode difference calculator 65, respectively, for all the pixels in the frame by sequentially moving the position of the mode block within the frame.

In step S63, the average value calculator 62 calculates the intra-mode difference average $D_{inav}$, which is the average of the intra-mode differences $D_{in}$ in the frame calculated by the intra-mode difference calculator 61. Similarly, in step S64, the average value calculator 66 calculates the inter-mode difference average $D_{outav}$, which is the average of the inter-mode differences $D_{out}$ in the frame calculated by the inter-mode difference calculator 65.

In step S65, the correction coefficient calculator 63 calculates a correction coefficient K. In other words, the correction coefficient calculator 63 calculates the correction coefficient K in accordance with equation (4) by dividing the intra-mode difference average $D_{inav}$ calculated by the average value calculator 62 by the inter-mode difference average $D_{outav}$ calculated by the average value calculator 66.

In step S66, the correction amount calculator 64 calculates a correction amount E represented by equation (5) in accordance with the correction coefficient K calculated by the correction coefficient calculator 63 and the inter-mode difference $d_{out}$ represented by equation (6), calculated by the inter-mode difference calculator 65.

The correction coefficient K and the correction amount E are explained as described below.

In a general natural image, an intra-mode difference average $D_{inav}$ and an inter-mode difference average $D_{outav}$ are equal to each other, as represented by equation (7).

$$D_{inav} = D_{outav} \quad (7)$$

Equation (7) means that there is no direction dependency in the pixel level gradient.

In this embodiment, however, since quadruple-density conversion is performed on a pixel, gaps are generated between blocks each constituted by four pixels in the converted image. Thus, the inter-mode difference average $D_{outav}$ is greater than the intra-mode difference average $D_{inav}$, as represented by condition (8).

$$D_{inav} < D_{outav} \quad (8)$$

In other words, on average, the inter-mode difference is greater than the intra-mode difference. This is because four HD pixels are generated from one SD pixel and this output is independently performed for each four pixels.

As described above, the values that should be equal to each other on average, as represented by equation (7), are not equal to each other in an image after pixel conversion, as represented by condition (8). Thus, correcting the values so as to be equal to each other enables the calculation result to be approximated to a desired image to be output (an image with higher accuracy).

Since, as represented by equation (7), the intra-mode difference average $D_{inav}$ and the inter-mode difference average $D_{outav}$ are equal to each other in the original image on which pixel conversion is not performed, the correction coefficient K represented by equation (4) represents how much smaller than the inter-mode difference, serving as the output result of the quadruple-density processing, the inter-mode difference in the original image is. Thus, approximating the inter-mode difference $D_{out}$ of the image, serving as the output result of quadruple-density processing, to the intra-mode difference $D_{in}$ corrects the image in the correct direction.

Figure 13:
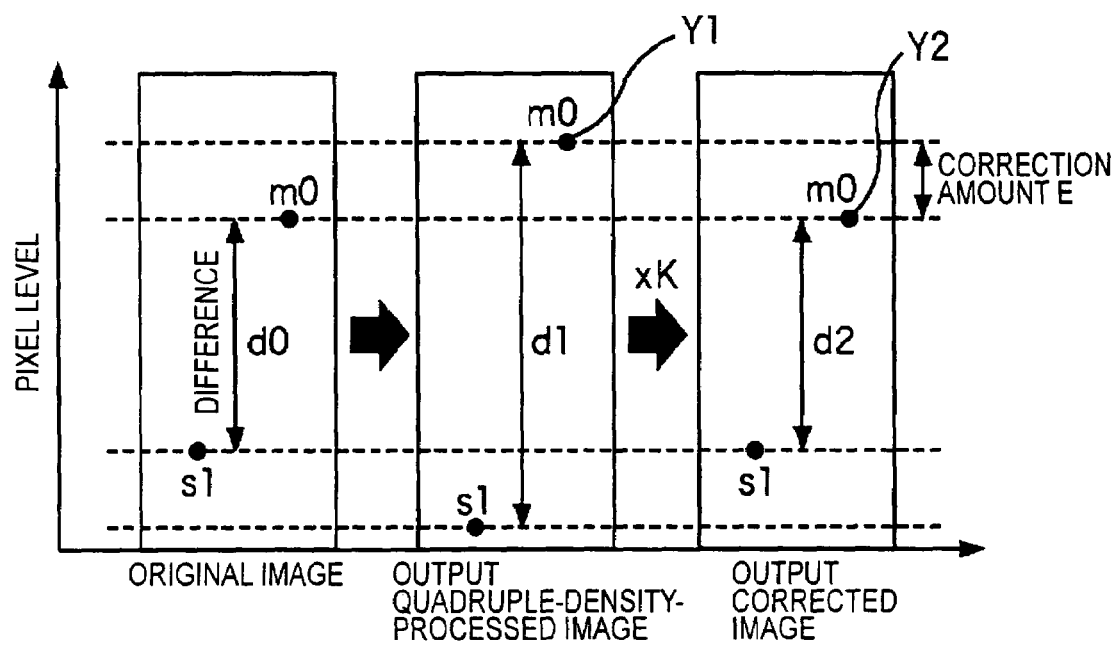
FIG. 13 is an illustration for explaining the principle of correction.

FIG. 13 shows this processing conceptually. As shown at the leftmost part in FIG. 13, the difference d0 between the target pixel m0 and the pixel s1 that is on the left of the target pixel m0 and that is outside the mode block for the target pixel m0 is obtained.

When quadruple-density pixel conversion is performed on this image, as shown at the center in FIG. 13, the difference between the target pixel m0 and the pixel s1 increases from d0 to d1 on average. This is the state of the signal $Y_1$ that is output as the HD prediction value from the HD prediction section 11.

Multiplying the correction coefficient K, which represents how much smaller than the difference d1 the difference d0 in the original image is, by the difference d1 enables the corrected difference d2 to be approximated to the original difference d0. The amount of correction used here is the correction amount E.

Since the processing for correcting the difference between the target pixel m0 and the pixel s1 is performed from two sides (correction performed when the pixel m0 functions as a target pixel and correction performed when the pixel s1 functions as a target pixel), the correction amount E is divided by two in equation (5).

The prediction value correction section 13 calculates the signal $Y_2$, which is the corrected HD image signal, by subtracting the correction amount E from the signal $Y_1$ output from the HD prediction section 11 in accordance with equation (1). Thus, on average, the inter-mode difference average approximates the intra-mode difference average in the whole screen, and an image without gaps between mode blocks can be achieved.

Although a case where quadruple-density pixel conversion is performed has been described, the multiplication factor is not limited to four. In addition, n-times density pixel conversion is not necessarily performed. 1/n-times density pixel conversion can also be performed.

The present invention is also applicable to television receivers, hard disk recorders, and other apparatuses for processing image signals.

The foregoing series of processes may be performed by hardware or software. In this case, for example, the signal processing apparatus 1 may include a personal computer shown in FIG. 14.

Figure 14:
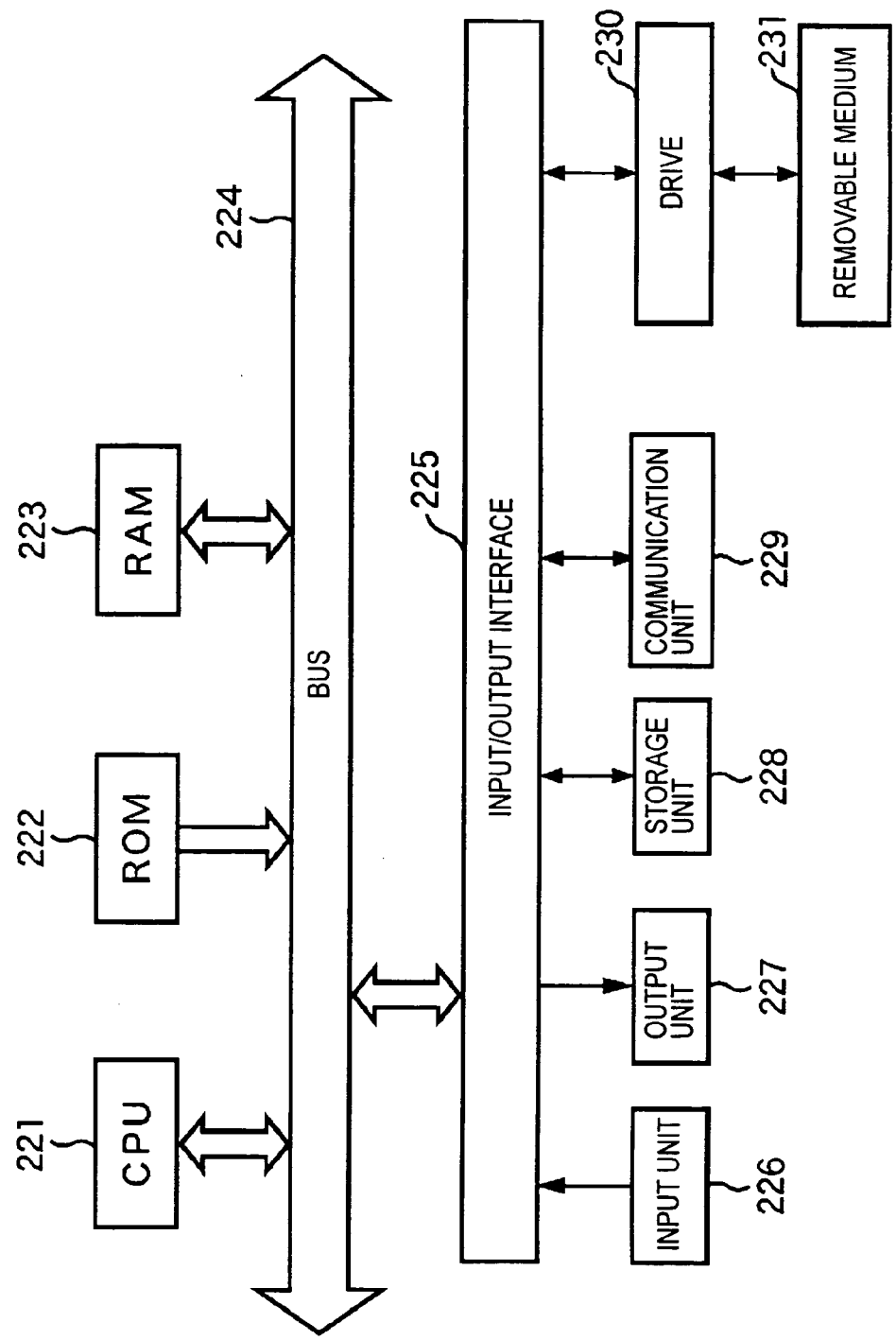
FIG. 14 is a block diagram showing an example of the structure of a personal computer.

Referring to FIG. 14, a central processing unit (CPU) 221 performs various types of processing in accordance with a program stored in a read-only memory (ROM) 222 or a program loaded into a random-access memory (RAM) 223 from a storage unit 228. Data necessary for the CPU 221 to perform the various types of processing is appropriately stored in the RAM 223.

The CPU 221, the ROM 222, and the RAM 223 are connected to each other via a bus 224. An input/output interface 225 is connected to the bus 224.

The input/output interface 225 is connected to an input unit 226 including a keyboard, a mouse, and the like; an output unit 227 including a display, such as a cathode-ray tube (CRT) or a liquid crystal device (LCD), and a speaker; the storage unit 228, such as a hard disk; and a communication unit 229, such as a modem. The communication unit 229 performs communication via a network including the Internet.

A drive 230 is connected to the input/output interface 225 according to need. A removable medium 231, such as a magnetic disk, an optical disk, a magneto-optical disk, or a semiconductor memory, is appropriately installed on the drive 230. A computer program read from the removable medium 231 is installed in the storage unit 228 according to need.

When the series of the foregoing processes is performed by software, a program constituting the software is installed via a network or a recording medium on a computer built in dedicated hardware or a general-purpose personal computer or the like capable of performing various functions by installing various programs.

As shown in FIG. 14, the recording medium not only includes the removable medium 231, such as a magnetic disk (including a flexible disk), an optical disk (including a compact disk-read only memory (CD-ROM) and a digital versatile disk (DVD)), a magneto-optical disk (including a MiniDisk (MD)), or a semiconductor memory, which is recorded with the program and is distributed in order to provide the program to a user independently of the apparatus main unit, but also includes the ROM 222 or the storage unit 228, such as a hard disk, which is built in the apparatus main unit to be provided to the user and which is recorded with the program.

In this specification, steps for a program recorded in the recording medium are not necessarily performed in chronological order in accordance with the written order. The steps may be performed in parallel or independently without being performed in chronological order.

In addition, in this specification, a system means the whole equipment including a plurality of apparatuses.

The present invention is also applicable to a personal computer performing image processing.

According to the foregoing embodiments, high-resolution images with higher quality can be generated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A signal processing apparatus comprising:
a generator operable to generate a second image signal by converting a first image signal into the second image signal;
a calculation unit operable to calculate a correction amount based on an evaluation of the second image signal relative to the first image signal, said evaluation involving calculating a first difference by using pixels within a block of pixels which includes a target pixel and calculating a second difference by using pixels outside the block of pixels; and
a correction unit operable to correct the second image signal based on the correction amount.

2. A signal processing apparatus, comprising:
a generator operable to generate a second image signal by converting a first image signal into the second image signal;
a calculation unit operable to calculate a correction amount based on an evaluation of the second image signal relative to the first image signal; and
a correction unit operable to correct the second image signal based on the correction amount,
wherein a block of pixels from among pixels constituting the second image signal includes a target pixel, and the calculation unit calculates a coefficient representing the evaluation based on a relationship between a first difference between the target pixel and pixels other than the target pixel within the block of pixels and a second difference between the target pixel and pixels outside the block of pixels.

3. The signal processing apparatus according to claim 2, wherein the calculation unit includes:
a first difference calculation unit operable to calculate the first difference between the target pixel and the pixels other than the target pixel within the block of pixels;
a second difference calculation unit operable to calculate the second difference between the target pixel and the pixels outside the block of pixels;
a first average value calculation unit operable to calculate an average of the first differences in a frame;
a second average value calculation unit operable to calculate an average of the second differences in the frame;
a coefficient calculation unit operable to calculate the coefficient based on a ratio of the average of the first differences in the frame and the average of the second differences in the frame; and
a correction amount calculation unit operable to calculate the correction amount based on the coefficient and the second difference.

4. A signal processing method, comprising:
generating a second image signal by converting a first image signal into the second image signal;
calculating a correction amount based on an evaluation of the second image signal relative to the first image signal, said evaluation involving calculating a first difference by using pixels within a block of pixels which includes a target pixel and calculating a second difference by using pixels outside the block of pixels; and
correcting the second image signal based on the correction amount.

5. A recording medium recorded with a computer-readable program for performing a signal processing method, the method comprising:
generating a second image signal by converting a first image signal into the second image signal;
calculating a correction amount based on an evaluation of the second image signal relative to the first image signal, said evaluation involving calculating a first difference by using pixels within a block of pixels which includes a target pixel and calculating a second difference by using pixels outside the block of pixels; and
correcting the second image signal based on the correction amount.

6. A system for performing a signal processing method, the system comprising:
a processor operable to execute instructions; and
instructions, the instructions including:
generating a second image signal by converting a first image signal into the second image signal;
calculating a correction amount based on an evaluation of the second image signal relative to the first image signal, said evaluation involving calculating a first difference by using pixels within a block of pixels which includes a target pixel and calculating a second difference by using pixels outside the block of pixels; and correcting the second image signal based on the correction amount.

7. A signal processing apparatus, comprising:

generating means for generating a second image signal by converting a first image signal into the second image signal;

calculation means for calculating a correction amount based on an evaluation of the second image signal relative to the first image signal, said evaluation involving calculating a first difference by using pixels within a block of pixels which includes a target pixel and calculating a second difference by using pixels outside the block of pixels; and correction means for correcting the second image signal based on the correction amount.

8. The signal processing apparatus according to claim 1, wherein the calculation unit calculates a coefficient representing the evaluation in accordance with a relationship between the first difference and the second difference, and in which calculating of the first difference involves obtaining a difference between the target pixel and the pixels other than the target pixel within the block of pixels which is among pixels constituting the second image and calculating of the second difference involves obtaining a difference between the target pixel and the pixels outside the block of pixels.

* * * * *